(12) United States Patent
Rodrigues

(10) Patent No.: US 9,062,612 B2
(45) Date of Patent: Jun. 23, 2015

(54) ACTUATION SYSTEM FOR A PROPULSIVE UNIT OF AN AIRPLANE

(75) Inventor: Fernand Rodrigues, Paris (FR)

(73) Assignee: SAGEM DEFENSE SECURITE, Paris (FR)

( * ) Notice: Subject to any disclaimer, the term of this patent is extended or adjusted under 35 U.S.C. 154(b) by 245 days.

(21) Appl. No.: 13/823,715

(22) PCT Filed: Oct. 21, 2011

(86) PCT No.: PCT/EP2011/068461
§ 371 (c)(1),
(2), (4) Date: Jul. 2, 2013

(87) PCT Pub. No.: WO2012/052552
PCT Pub. Date: Apr. 26, 2012

(65) Prior Publication Data
US 2013/0294893 A1 Nov. 7, 2013

(30) Foreign Application Priority Data

Oct. 21, 2010 (FR) ...................................... 10 58628

(51) Int. Cl.
*F02C 7/36* (2006.01)
*F02K 1/72* (2006.01)
*F02K 1/76* (2006.01)

(52) U.S. Cl.
CPC ... *F02C 7/36* (2013.01); *F02K 1/72* (2013.01); *F02K 1/763* (2013.01); *F05D 2260/40311* (2013.01)

(58) Field of Classification Search
CPC ........... B64D 33/04; F02K 1/72; F02K 1/763; F05D 2260/40311
See application file for complete search history.

(56) References Cited

U.S. PATENT DOCUMENTS

| 5,778,659 | A  | * | 7/1998  | Duesler et al. | ............... | 60/226.1 |
| 5,806,302 | A  |   | 9/1998  | Cariola et al. | | |
| 8,869,504 | B1 | * | 10/2014 | Schwarz et al. | ............. | 60/226.1 |
| 8,919,667 | B2 | * | 12/2014 | Vauchel | ................... | 239/265.11 |
| 8,931,253 | B2 | * | 1/2015  | Baudu et al. | ................. | 60/226.2 |

FOREIGN PATENT DOCUMENTS

| FR | 2922059 | 4/2009 |
| FR | 2929655 | 10/2009 |
| WO | WO 03/100241 | 12/2003 |

* cited by examiner

*Primary Examiner* — Valentina Xavier
(74) *Attorney, Agent, or Firm* — Blakely Sokoloff Taylor & Zafman

(57) ABSTRACT

The invention relates to an actuation system (100) for a propulsive unit including a nacelle, a turbojet engine, and an air circulation channel defined between the nacelle and the turbojet engine, the actuation system (100) including: a body and a connection device for attaching the body to the nacelle, the connection device enabling the body to move relative to the nacelle along two axes of rotation; a first member for moving a flap for controlling the airflow in the channel, the first member extending from the body and having a first point for attaching the first member to the flap; a second member for moving a thrust-reversing flap, the second member extending from the body and having a second point for attaching the second member to the flap, the body being arranged between the first and second attachment points; and a transmission device (40) having an input (42), a first output (44) connected to the first member (50), and a second output (43) connected to the second member (70), the transmission device (40) being capable of selectively transmitting input movement towards the first output, in order to move the flow-controlling flap, or towards the second output, in order to move the thrust-reversing flap.

14 Claims, 3 Drawing Sheets

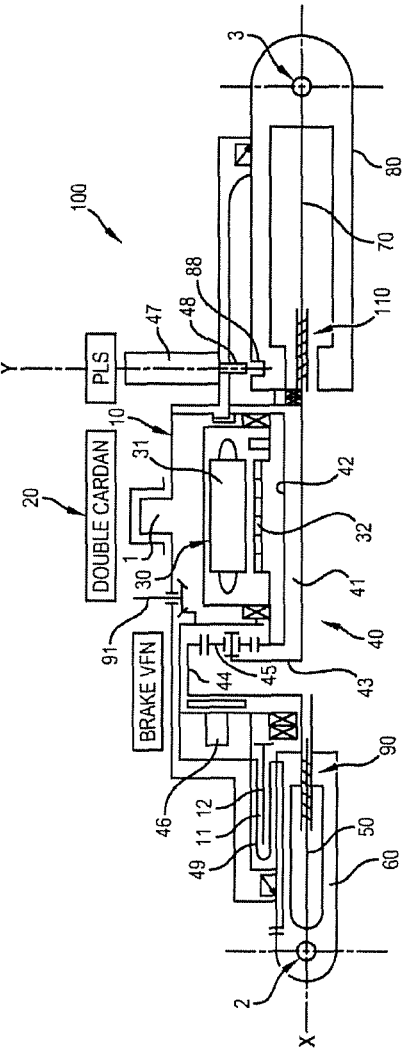
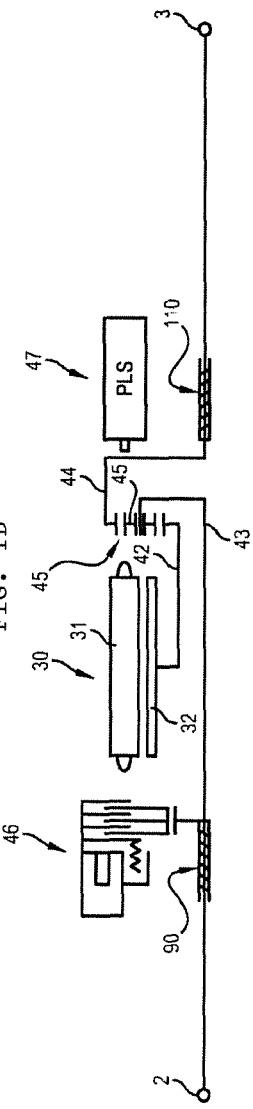
FIG. 1A
FIG. 1B

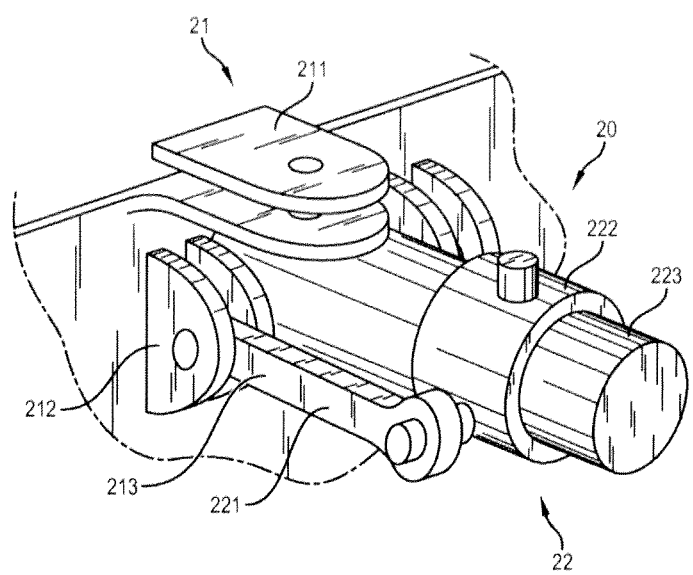

ACTUATION SYSTEM FOR A PROPULSIVE UNIT OF AN AIRPLANE

TECHNICAL FIELD

The invention concerns a system for actuating movable flaps for an aircraft propulsion unit, as well as a propulsion unit including such a system.

PRIOR ART

An aircraft propulsion unit generally comprises a nacelle fixed to a wing of the aircraft and a turbojet engine fixed to the nacelle. In the case of a dual-flow turbojet engine, the turbojet engine includes a compressor, a combustion chamber, a high-pressure turbine for driving the compressor and a low-pressure turbine for driving a blower in rotation. The blower accelerates a cold air flow circulating in an annular conduit defined between the turbojet engine and the nacelle, to generate the thrust necessary to the propulsion of the aircraft.

Propulsion units are equipped with various systems integrated between the external skin of the nacelle and the turbojet engine.

Propulsion units comprise in particular a thrust reversal system or TRAS ("Thrust Reverse Actuation System") for reversing the thrust in the landing phases in order to improve the braking capacity of the aircraft. Such a system comprises a set of movable flaps actuated by associated jacks for obstructing the annular conduit and diverting the cold air flow towards the front of the aircraft, thereby generating a counter-thrust that is added to the braking of the wheels.

In the case of a so-called "door-type" thrust reversal system, the nacelle is equipped with movable flaps (referred to as "doors") that pivot with respect to the structure of the nacelle between a retracted position in which they allow a circulation of the air flow in the conduit towards the rear of the nacelle and a deployed position in which the flaps block the air flow and reorient it towards the front the nacelle.

In the case of a so-called "cascade-type" thrust reversal system, the nacelle is equipped with movable flaps that slide along rails between retracted position in which they allow a circulation of the air flow in the conduit towards the rear of the nacelle and a deployed position in which they uncover cascade vanes grids disposed in the thickness of the nacelle.

In general terms, in one or other of the cases, the movable flaps are actuated by a set of dedicated jacks.

Moreover, in order to optimise fuel consumption, the propulsion system may comprise a system for regulating the air flow or VFN ("Variable Fan Nozzle") system. Such a system regulates the cold air flow circulating in the annular conduit according to the speed of the aircraft. Such a system generally comprises movable flaps actuated by jacks in order to vary the cross section of the circulation conduit.

In order to achieve additional fuel savings, aircraft manufacturers seek to reduce to the maximum possible extent the aerodynamic drag generated by the propulsion units. This is done in particular by reducing the thickness of the nacelle. This has the consequence of leaving little space for the various systems integrated between the external skin of the nacelle and the turbojet engine.

Document FR 2 922 059 describes a double-action linear actuator for independently moving an internal part and an external part of a cover with respect to the nacelle. The actuator comprises a base designed to be attached to the nacelle, a first rod movable in translation with respect to the base and intended to be attached to the internal part of the cover, and a second rod also movable in translation with respect to the base and intended to be attached to the external cover part.

The actuator proposed in this document enables one or other of the cover parts to be moved by a single motor, so as to allow selective control of the thrust reversal system or of the air flow regulation system.

In the actuator proposed in this document the first rod and the second rod are formed by tubes able to slide one in the other telescopically. This has the effect of generating stresses in the device when, during a movement of one or other of the cover parts, the three fixing points of the device (point of attachment of the base to the nacelle, point of fixing of the first rod to the internal cover part and point of fixing of the second rod to the external cover part) may no longer be aligned.

SUMMARY OF THE INVENTION

One aim of the invention is to propose a system for actuating movable flaps for a propulsion unit having reduced size and limiting the stresses generated in the system.

This problem is solved in the context of the present invention by virtue of an actuation system for a propulsion unit including a nacelle, a turbojet engine and an air circulation conduit defined between the nacelle and the turbojet engine, the actuation system comprising:
  a body and a connection device for fixing the body to the nacelle, the connection device allowing a movement of the body with respect to the nacelle according two rotation axes,
  a first member for moving a flap regulating an air flow circulating in the conduit, the first member extending from the body and having a first point for fixing the first member to the flap,
  a second member for moving a thrust reversal flap, the second member extending from the body and having a second point for fixing the second the second member to the flap, the body being disposed between the first fixing point and the second fixing point, and
  a transmission device having an input, a first output connected to the first member and a second output connected to the second member, the transmission device being able to transmit an input movement selectively to the first output to move the flow regulation flap to the second output for moving the thrust reversal flap.

By means of such an actuation system, the flow regulation flap and the thrust reversal flap are controlled by a single actuation system, which reduces the overall size of the equipment integrated in the propulsion unit.

As the fixing points are positioned on either side of the body and the body can move with respect to the nacelle according to two degrees of freedom, the body is positioned by itself so as to obtain an alignment of the three fixing points of the system. This limits the stresses exerted between the body and the movement members.

In addition, the actuation system proposed may have the following features:
  the connection device comprises a double cardan,
  the first movement member and the second movement member are able to move in translation with respect to the body in parallel translation directions,
  the first movement member is movable in translation with respect to the body between a retracted position and a deployed position, in a first deployment direction, and the second movement member is able to move in translation with respect to the body between a retracted position and a deployed position, in a second deployment direction opposite to the first deployment direction, the device comprises a supply cable extending between the nacelle and the body in order to supply the actuation system, the cable being folded to form two cable strands, the strands being able to translate with respect to each other in order to absorb a movement of the body with respect to the nacelle, the device comprises a motor connected to the input of the transmission device in order to generate an input movement, the transmission device comprises an epicyclic gear train, including a sun wheel connected to the input and a planet holder and a ring connected to the first and second outputs, the transmission device comprises locking means for immobilising the first output when a movement of the thrust reversal flap is enabled, in particular, the locking means includes an electromagnetic brake, the transmission device comprises a locking means for immobilising the second output when a movement of the flow regulation flap is enabled, in particular, the locking means includes a locking finger able to move between a retracted position in which the thrust reversal flap is free to move and a deployed position in which the finger prevents the movement of the thrust reversal flap, the system comprises synchronisation means for synchronising the first output with a first output of another actuation system for the propulsion unit, the synchronisation means comprise a flexible rod connecting the first output to a second output of the other actuation system.

The invention also relates to a propulsion unit including:
a nacelle,
a turbojet engine,
an air circulation conduit defined between the nacelle and the turbojet engine,
a flap for regulating the air flow circulating in the conduit,
a thrust reversal flap, and
an actuation system as defined previously for selectively moving the flow regulation flap or the thrust reversal flap with respect to the nacelle.

BRIEF DESCRIPTION OF THE DRAWINGS

Other features and advantages will emerge further from the description that follows, which is purely illustrative and non-limitative and must be read with regard to the accompanying figures, among which:

FIG. 1A shows schematically in section an actuation system according to one embodiment of the invention, FIG. 1B shows schematically a variant of the actuation system of FIG. 1A, FIG. 2 shows schematically a connection device for fixing the body of the actuation system to the nacelle.

DESCRIPTION OF ONE EMBODIMENT

Figure 3:
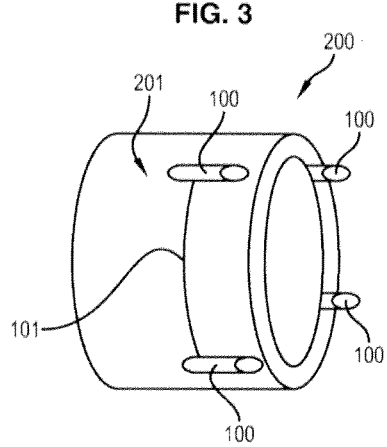
FIG. 3 shows schematically a propulsion unit comprising a plurality of actuation systems.

In FIG. 1A, the actuation system 100 shown comprises a body 10 and a connection device 20 for fixing the body 10 to the nacelle of the propulsion unit.

The system also comprises an electric motor 30 and a transmission device 40, arranged inside the body 10.

The system also comprises a first rod 50 able to move with respect to the body 10, for moving a flow regulation flap 60, and a second rod 70 able to move with respect to the body 10, for moving a thrust reversal flap 90.

The first rod 50 is able to move in translation with respect to the body 10 between a retracted position and a deployed position along movement direction presented by an axis X.

The second rod 70 is also able to move in translation with respect to the body 10 between retracted position and a deployed position along a movement direction parallel to the direction of movement of the first rod 50.

More precisely, the first rod 50 is able to move between a retracted position and a deployed position, in a first deployment direction, and the second rod 70 is able to move between a retracted position and a deployed position, in a second deployment direction opposite to the first deployment direction.

Thus the body 10 is positioned between the two rods 50 and 70 and the two rods project from the body 10 in opposite directions.

The connection device 20 is a double cardan device allowing a movement of the body 10 with respect to the nacelle on two rotation axes perpendicular to each other.

The transmission device 40 is a mechanical device with one input and two outputs, making it possible to transmit a movement that it receives as an input from the electric motor 30 electively to a first output for controlling the movement of the first movable rod 50 or to a second output for controlling the movement of the second movable rod 70.

More precisely, the transmission device 40 includes a epicyclic gear train 41 composed of a sun wheel 42 connected to the motor input, a planet holder 43 connected to the second output, a ring 44 connected to the first output and Stellites 45 arranged between the sun wheel 42 and the ring 44 and supported by arms of the planet holder 43.

The electric motor 30 comprises a stator 31 fixed with respect to the body 10 and a hollow rotor 32 able to be driven in rotation about an axis X when the motor supplied. The rotor 32 is secured to the sun wheel 42, which constitutes the input part of the transmission system. The motor is thus able to rotate the sun wheel 42 with respect to the body 10 about the axis X.

The first movable rod 50 is connected to the ring 44 by means of a screw and nut connection device 90 for converting a rotation movement of the ring 44 about the axis X into a translation movement of the first rod 50 parallel to the axis X. The ring 44 thus constitutes the first output part of the transmission device 40.

Likewise, the second movable rod 60 is connected to the planet holder 45 by means of a screw and nut connection device 110 for converting a rotation movement of the planet holder 43 about the axis X into a translation movement of the second rod 70 parallel to the axis X. The planet holder 43 thus constitutes the second output part of the transmission device 40.

The transmission device 40 also includes an electromagnetic brake 46 able to be actuated so as to immobilise the ring 44 with respect to the body 10.

The transmission device 40 also includes a locking means 47 able to be actuated so as to selectively lock or release the thrust reversal flap 80. The this end, the locking means 47 comprises a finger 48 able to move in translation in a direction Y perpendicular to the direction X of movement of the thrust reversal flap 80. The finger 48 is able to be moved between a retracted position in which it releases the thrust reversal flap 80 and a deployed position in which it is received in a corresponding housing 83 in the thrust reversal flap 80 in order to prevent any movement thereof.

The transmission device 40 also includes a supply cable 49 for connecting the motor 30 to an electrical energy source. The body 10 comprises an internal channel 11 in which the supply cable 49 extends. The internal channel 11 has a "hairpin" shape with two parallel portions 13 and 14. The body 10 comprises a separation wall 12 separating the two parallel portions 13 and 14 of the internal channel. Thus the supply cable 49 is folded so as to follow the channel 11 and forms two cable lengths arranged on either side of the separation wall 11. In the event of movement of the body 10 with respect to the nacelle, the separation wall 12 moves with respect to the nacelle and the cable lengths 49 translate with respect to each other without damaging the cable.

Moreover, the transmission device 40 also comprises a mechanical output 91 connected to the ring 44 for synchronising the movement of the flow regulation flap 60 with the movement of the other flow regulation flaps of the propulsion assembly. The system 100 comprises a flexible transmission rod for connecting all the mechanical outputs 91 of the actuation systems 100 of the propulsion unit.

For a given speed of driving of the motor 30, the actuation system 100 shown in FIG. 1A makes it possible to provide a rapid movement speed of the air flow regulation flap 60 and a slow movement speed of the thrust reversal flap 80.

FIG. 1B shows schematically a variant of the actuation system 100 of FIG. 1A.

In this variant, the sun wheel 42 is still connected to the motor input. However, the planet holder 43 is connected to the first output (movable rod 50) and the ring 44 is connected to the second output (movable rod 70).

For a given speed of driving of the motor, the actuation system thus provides a slow speed of movement of the air flow regulation flap 60 and a rapid speed of movement of the thrust reversal flap 80.

FIG. 2 shows schematically a connection device 20 for fixing the body of the actuation system to the nacelle.

The connection device 20 is a double cardan device comprising a first cardan device 21 and a second cardan device 22.

The first cardan device 21 comprises a first fork 211 secured to the nacelle, an intermediate piece 212 and a second fork 213. The intermediate piece 212 is mounted so as to rotate firstly with respect to the first fork 211 about a first axis and secondly with respect to the second fork 213 about second rotation axis perpendicular to the first axis.

Likewise, the second cardan device 22 comprises a first or 221 secured to the second fork 213 of the first cardan device 21, an intermediate piece 222 and a second fork 223 secured to he body 10 of the actuation device. The intermediate piece 222 is mounted so as to rotate firstly with respect to the first fork 221 about a first axis and secondly with respect to the second fork 223 about a second rotation axis perpendicular to the first axis.

Such a connection device 20 allows a movement of the body 10 of the actuation device with respect to the nacelle in order to take account of a possible misalignment of the three fixing points of the actuation device, in particular when the air flow regulation flap 60 and the thrust reversal flap are simultaneously in the deployed position.

The point 1 is the point of fixing of the body 10 to the nacelle. The point 2 is the point of fixing of the first rod 50 to the air flow regulation flap 60. The point 3 is the point of fixing of the second rod 70 to the thrust reversal flap 80.

Figure 4:
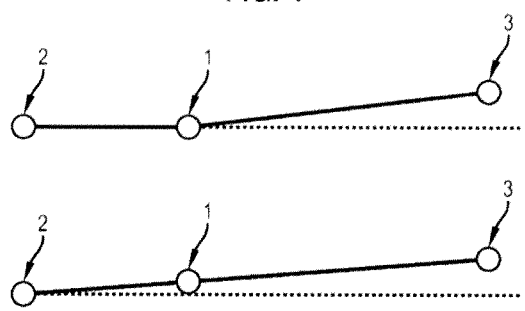
FIG. 4 illustrates schematically a possible misalignment between three fixing points of the actuation system.

As illustrated in FIG. 4, the fixing of the body 10 of the actuation system to the nacelle by means of the double cardan connection device 20 allows a misalignment of the three points of fixing of the system respectively to the air flow regulation flap (point 2), to the nacelle (point 1) and to the thrust reversal flap (point 3). In particular, the three points are no longer necessarily in the same plane.

FIG. 3 shows schematically a propulsion assembly 200 comprising a nacelle 201 and a plurality of actuation systems 100. In the event of breakdown of the electrical synchronisation, a mechanical synchronisation of the actuation systems 100 is achieved by means of flexible rods 101 connecting all the mechanical outputs of the actuation systems 100.

The actuation device 40 can be controlled according to two operating modes.

"Air Flow Regulation" Operating Mode

This operating mode can be activated only in flight.

In this operating mode, the second output (planet holder 43) of the transmission device 40 is locked by means of the locking means 47. The movable finger 48 is in the deployed position and is received in the housing 88 of the thrust reversal flap in order to prevent any movement thereof.

The electromagnetic brake 46 is activated in order to release the first output (ring 44) of the transmission device 40.

When the electric motor 30 is controlled for rotation, the rotation movement of the sun-wheel input 42 of the transmission device 40 is transmitted to the first output (ring 44) of the transmission device. The rotation movement of the ring 44 is converted into a translation movement of the first rod 50 by means of the screw and nut connection device 90.

Thus the first rod 50 moves with respect to the body 10 of the actuation system 40 and causes a corresponding movement of the flow regulation flap 60.

The "air flow regulation" command makes it possible to move the first rod 50 between a first retracted position in which the distance between the points 1 and 2 is at a minimum and a deployed position in which the distance between the points 1 and 2 is at a maximum, the distance between the points 1 and 3 being constant.

"Thrust Reversal" Operating Mode

When the conditions are fulfilled to enable the "thrust reversal" command to be activated, the first rod 50 is immobilised in the deployed position by means of the electromagnetic brake 46.

The locking means 47 is controlled so as to unlock the second output (planet holder 43) of the transmission device 40. More precisely, the locking finger 48 is retracted so as to release the thrust reversal flap 80 and allow movement thereof.

When the electric motor 30 is controlled for rotation, the rotation movement at the input (sun wheel 42) of the transmission device 40 is transmitted to the second output (planet holder 43) of the transmission device 40. The rotation movement of the planet holder 43 is converted into a translation movement of the second rod 70 by means of the screw and nut connection device 110.

Thus the second rod 70 moves with respect to the body 10 of the actuation system and causes the corresponding movement of the thrust reversal flap 80.

The "thrust reversal" command makes it possible to vary the distance between the points 1 and 3, the distance between the points 1 and 2 being constant.

The invention claimed is:

1. Actuation system (100) for a propulsion unit including a nacelle, a turbojet engine and an air circulation conduit defined between the nacelle and the turbojet engine, the actuation system (100) comprising:
    a body (10) and a connection device (20) for fixing the body (10) to the nacelle, the connection device (20) for fixing the body to the nacelle, the connection device allowing a movement of the body with respect to the nacelle on two rotation axes, a first member (50) for moving a flap (60) regulating an air flow circulating in the conduit, the first member (50) extending from the body (10) and having a first point (2) for fixing the first member to the flap (60), a second member (70) for moving a thrust reversal flap (80), the second member (70) extending from the body (10) and having a second point (1) for fixing the second member to the flap (80), the body (10) being disposed between the first fixing point (2) and the second fixing point (1), and a transmission device (40) having an input (42), a first output (44) connected to the first member (50) and a second output (43) connected to the second member (70), the transmission device (40) being able to transmit an input movement selectively to the first output to move the flow regulation flap to the second output for moving the thrust reversal flap.

2. System according to claim 1, in which the connection device (20) comprises a double cardan.

3. System according to claim 1, in which the first movement member (50) and the second movement member (70) are able to move in translation with respect to the body (10) in parallel translation directions.

4. System according to claim 1, in which:
the first movement member (50) is movable in translation with respect to the body (10) between a retracted position and a deployed position, in a first deployment direction, and the second movement member (70) is able to move in translation with respect to the body (10) between a retracted position and a deployed position, in a second deployment direction opposite to the first deployment direction.

5. System according to claim 1, comprising a supply cable (49) extending between the nacelle and the body (10) in order to supply the actuation system (100), the cable (49) being folded to form two cable lengths, the lengths being able to translate with respect to each other in order to absorb a movement of the body (10) with respect to the nacelle.

6. System according to claim 1, comprising a motor (30) connected to the input (42) of the transmission device (40) in order to generate an input movement.

7. System according to claim 1, in which the transmission device (40) comprises an epicyclic gear train (41), including a sun wheel (42) as an input, and a ring (44) and a planet holder (43) as first and second outputs.

8. System according to claim 1, in which the transmission device (40) comprises a locking means (46) for immobilising the first output (44) when a movement of the thrust reversal flap (80) is enabled.

9. System according to claim 8, in which the locking means (46) includes an electromagnetic brake.

10. System according to claims 1, in which the transmission device (40) comprises a locking means (47) for immobilising the second output (43) when a movement of the flow regulation flap is enabled.

11. System according to claim 10, in which the locking means (47) includes a locking finger (48) able to move between a retracted position in which the thrust reversal flap (80) is free to move and a deployed position in which the finger (48) prevents the movement of the thrust reversal flap (80).

12. System according to claim 1, comprising synchronisation means (91, 101) for synchronising the first output with a first output (44) of another actuation system for the propulsion unit.

13. System according to claim 12, in which the synchronisation means (91, 101) comprise a flexible rod (101) connecting the first output (43) to a second output of the other actuation system.

14. Propulsion unit (200) including:
a nacelle (201),
a turbojet engine,
an air circulation conduit defined between the nacelle and the turbojet engine,
a flap (60) for regulating the air flow circulating the conduit,
a thrust reversal flap (80), and
an actuation system (100) in accordance with one of claims 1 to 12 for selectively moving the flow regulation flap (60) or the thrust reversal flap (80) with respect to the nacelle (201).

* * * * *

UNITED STATES PATENT AND TRADEMARK OFFICE
CERTIFICATE OF CORRECTION

| | | |
|---|---|---|
| PATENT NO. | : 9,062,612 B2 | Page 1 of 1 |
| APPLICATION NO. | : 13/823715 | |
| DATED | : June 23, 2015 | |
| INVENTOR(S) | : Fernand Rodrigues | |

It is certified that error appears in the above-identified patent and that said Letters Patent is hereby corrected as shown below:

Claims

In Column 8, Claim 10, line 11, delete "claims" and insert --claim--

Signed and Sealed this
Twenty-ninth Day of March, 2016

Michelle K. Lee
*Director of the United States Patent and Trademark Office*